United States Patent
Reimer et al.

(10) Patent No.: US 12,339,563 B1
(45) Date of Patent: Jun. 24, 2025

(54) CONTROLLED CHIRP IN OPTICAL DEVICES

(71) Applicant: HyperLight Corporation, Cambridge, MA (US)

(72) Inventors: Christian Reimer, Wellesley, MA (US); Mian Zhang, Cambridge, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 18/972,332

(22) Filed: Dec. 6, 2024

Related U.S. Application Data (60) Provisional application No. 63/607,485, filed on Dec. 7, 2023.

(51) Int. Cl.
*G02F 1/225* (2006.01)
*G02F 1/21* (2006.01)

(52) U.S. Cl.
CPC ............ *G02F 1/2255* (2013.01); *G02F 1/212* (2021.01); *G02F 2203/25* (2013.01)

(58) Field of Classification Search
CPC ........ G02F 1/035; G02F 1/0356; G02F 1/225; G02F 1/2255; G02F 2201/127; G02F 2202/20; G02F 2203/25; G02F 2203/255
USPC ......................................................... 385/1–3
See application file for complete search history.

(56) References Cited

U.S. PATENT DOCUMENTS

| | | | | |
|---|---|---|---|---|
| 5,074,631 A * | 12/1991 | Hamano | ............... | G02F 1/3136 385/3 |
| 6,192,167 B1 * | 2/2001 | Kissa | .................... | G02F 1/0356 385/2 |
| 6,535,653 B1 * | 3/2003 | Hung | ..................... | G02F 1/225 385/40 |
| 10,678,112 B2 * | 6/2020 | Parvizi | ................. | G02F 1/2255 |
| 12,001,116 B2 | 6/2024 | Jacques | | |
| 2003/0016430 A1 * | 1/2003 | Ransijn | ................ | H04B 10/505 359/322 |
| 2003/0190107 A1 | 10/2003 | Walker | | |
| 2006/0120654 A1 * | 6/2006 | Aoki | ..................... | G02F 1/2255 385/40 |
| 2006/0120655 A1 * | 6/2006 | Walker | .................. | G02F 1/0123 385/9 |
| 2019/0146302 A1 | 5/2019 | Iwatsuka | | |
| 2024/0248331 A1 * | 7/2024 | Jacques | ................. | G02F 1/0316 |

* cited by examiner

*Primary Examiner* — Robert Tavlykaev
(74) *Attorney, Agent, or Firm* — Van Pelt, Yi & James LLP (57) ABSTRACT

An electro-optic device including a first waveguide, a second waveguide, and electrodes is described. The first waveguide includes a first thin film lithium-containing (TFLC) electro-optic material and carries a first optical signal. The second waveguide includes a second TFLC electro-optic material and carries a second optical signal. The electrodes include a differential electrode pair proximate to a portion of the first waveguide and to a portion of the second waveguide. The differential electrode pair is configured to provide a first modulation to the first optical signal and a second modulation to the second optical signal. A first magnitude of the first modulation is different from a second magnitude of the second modulation such that the electro-optic device has an engineered chirp.

20 Claims, 6 Drawing Sheets

CONTROLLED CHIRP IN OPTICAL DEVICES

CROSS REFERENCE TO OTHER APPLICATIONS

This application claims priority to U.S. Provisional Patent Application No. 63/607,485 entitled CONTROLLED CHIRP IN OPTICAL DEVICES filed Dec. 7, 2023 which is incorporated herein by reference for all purposes.

BACKGROUND OF THE INVENTION

Optical modulators may be used to encode data into optical signals (e.g. visible, infrared, or other portions of the spectrum of light). For example, in an electro-optic modulator, an electrical signal (e.g. having a frequency in the microwave range—from hundred of kHz through hundreds of GHz) is driven through electrodes that are in proximity to a waveguide. The electric field generated by the electrical signal in the electrodes (also termed "electrode signal" herein) changes the index of refraction of an electro-optic material that carries the optical signal. The change in index of refraction can provide intensity or phase modulation, depending on the configuration of the waveguide. Thus, data may be optically transmitted.

Although signals may be transmitted optically, the optical signal may be subject to chirp. Chirp may occur when a modulator includes two waveguide arms, each of which undergoes modulation as described herein. If there are differences in the modulation (e.g. the magnitude of intensity modulation), chirp may be introduced. Chirp may be undesirable in optical signals because optical signals are generally transmitted via optical fibers. Optical fibers are often subject to dispersion for certain wavelengths. For example, some optical fibers are dispersion free at a particular wavelength (e.g. 1311 nanometers), but introduce positive or negative dispersion for higher or lower wavelengths. As a result, the optical signal may be distorted. Accordingly, what is desired are techniques for reducing distortion in optical signals.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although data may be transmitted via optical signals, the optical signal may be subject to noise or other issues that affect transmission. For example, chirp may be inadvertently introduced during modulation. Signals traveling through optical fibers also experience dispersion. This dispersion in combination with the uncontrolled chirp may result in a distortion of the optical signal that interferes with or prevents the receiver from properly decoding the information carried by the optical signal. Accordingly, what is desired are techniques for reducing distortion in optical signals.

An electro-optic device includes a first waveguide, a second waveguide, and electrodes. The first waveguide includes a first thin film lithium-containing (TFLC) electro-optic material and is configured to carry a first optical signal. The second waveguide includes a second TFLC electro-optic material and is configured to carry a second optical signal. The plurality of electrodes includes a differential electrode pair proximate to a portion of the first waveguide and to a portion of the second waveguide. The differential electrode pair is configured to provide a first modulation to the first optical signal and a second modulation to the second optical signal. A first magnitude of the first modulation is different from a second magnitude of the second modulation such that the electro-optic device has an engineered chirp.

In some embodiments, the electrodes include a first signal electrode, a second signal electrode, and a ground electrode. The first signal electrode and the second signal electrode form the differential electrode pair. The first signal electrode, the second signal electrode, and the ground electrode form a differential electrode trio. In some embodiments, the first signal electrode and the second signal electrode are separated by a first gap proximate to the first waveguide. In such embodiments, the second signal electrode and the ground electrode are separated by a second gap proximate to the second waveguide. The second gap is different from the first gap such that the first modulation has the first magnitude and the second modulation has the second magnitude. In some embodiments, the first gap and the second gap are configured such that the first magnitude (M1) for the first waveguide is twice as large as the second magnitude (M2) for the second waveguide, electro-optic device having chirp parameter (C) of C=1/3, with C=(M1−M2)/(M1+M2). In some embodiments, the first gap and the second gap are configured such that the first magnitude (M1) for the first waveguide and the second magnitude (M2) for the second waveguide result in the electro-optic device having a chirp parameter of at least 0.1 and not greater than 0.9 or not greater than −0.1 and at least −0.9, where C=(M1−M2)/(M1+M2) (−0.9≤C≤−0.1 or 0.1≤C≤0.9).

In some embodiments, the electro-optic device includes third and fourth waveguides including third and fourth TFLC electro-optic materials, respectively, and configured to carry third and fourth optical signals, respectively. In such embodiments, the electrodes include a second differential electrode pair proximate to a portion of the third waveguide and to a portion of the fourth waveguide. The differential electrode pair has a first length proximate to the first and second waveguides and the second differential electrode pair has a second length proximate to the third and fourth waveguides. The first length is different from the second length.

In some embodiments, the first waveguide and the second waveguide are coupled to an optical signal transmitter having a dispersion. For example, the optical transmitter may include an optical fiber coupled to the first and second waveguides and having the dispersion. The engineered chirp is opposite to the dispersion. In some embodiments, the first and second waveguides are arms of a modulator waveguide including the first waveguide, the second waveguide, a first splitter and a second splitter. The first and second waveguides are between the first splitter and the second splitter.

An electro-optic device including waveguide pairs and electrode trios is described. Each of the waveguide pairs includes a first waveguide and a second waveguide. Each of the waveguide pairs including a thin film lithium-containing (TFLC) electro-optic material and is configured to carry a first optical signal in the first waveguide and a second optical signal in the second waveguide. Each of the electrode trios includes a differential electrode pair and a ground electrode. A first signal electrode of the differential electrode pair is proximate to a portion of the first waveguide. A second signal electrode of differential electrode pair is proximate to a region between the first waveguide and the second waveguide. The ground electrode is proximate to a portion of the second waveguide. Each of the electrode trios is configured to provide a first modulation having a first magnitude to the first optical signal and a second modulation having a second magnitude to the second optical signal. The first magnitude is different from the second magnitude for at least one of the plurality of electrode trios such that at least one of the plurality of waveguide pairs has an engineered chirp.

In some embodiments, the first signal electrode and the second signal electrode of the electrode trio(s) are separated by a first gap proximate to the first waveguide of the waveguide pair(s). The second signal electrode and the ground electrode of the electrode trio(s) are separated by a second gap proximate to the second waveguide of the waveguide pair(s). The second gap is different from the first gap such that the first modulation has the first magnitude and the second modulation has the second magnitude for the waveguide pair(s). In some embodiments, the first gap and the second gap for the electrode trio(s) are configured such that the first magnitude (M1) and the second magnitude (M2) for the first and second waveguides of the waveguide pair(s) result in of the waveguide pair(s) has a chirp parameter of at least 0.1 and not greater than 0.9 or not greater than −0.1 and at least −0.9, where C=(M1−M2)/(M1+M2).

In some embodiments, a first electrode trio has a first length proximate to a first waveguide pair and a second electrode trio has a second length proximate to a second waveguide pair. The first length being different from the second length. Each of the waveguide pairs may be coupled to an optical signal transmitter having a dispersion. The engineered chirp is configured based on the dispersion. In some embodiments, the optical signal transmitter includes an optical fiber coupled to the electro-optic device.

A method includes providing a first optical signal to a first waveguide including a first thin film lithium-containing (TFLC) electro-optic material. A second optical signal is provided to a second waveguide including a second TFLC electro-optic material. An electro-optic device includes the first waveguide and the second waveguide. Electrode signals are driven through electrodes. The electrodes include a differential electrode pair proximate to a portion of the first waveguide and proximate to a portion of the second waveguide. The electrode signals in the differential electrode pair are configured to provide a first modulation having a first magnitude to the first optical signal and a second modulation having a second magnitude to the second optical signal. The first modulation being different from the second modulation such that the electro-optic device has an engineered chirp.

In some embodiments, the electrodes include a first signal electrode, a second signal electrode, and a ground electrode. The differential electrode pair includes the first signal electrode and the second signal electrode. The first signal electrode, the second signal electrode, and the ground electrode form a differential electrode trio. In some embodiments, the first signal electrode and the second signal electrode are separated by a first gap proximate to the first waveguide. The second signal electrode and the ground electrode may be separated by a second gap proximate to the second waveguide. The second gap is different from the first gap such that the first magnitude (M1) for the first waveguide and the second magnitude (M2) for the second waveguide result in the electro-optic device having a chirp parameter of at least 0.1 and not greater than 0.9 or not greater than −0.1 and at least −0.9, where C=(M1−M2)/(M1+M2).

In some embodiments, the method includes driving third and fourth optical signals through third and fourth waveguides, respectively. The third waveguide includes a third TFLC electro-optic material. The fourth waveguide includes a fourth TFLC electro-optic material. In such embodiments, the electrodes includes a second differential electrode pair proximate to a portion of the third waveguide and to a portion of the fourth waveguide. The differential electrode pair has a first length proximate to the first and second waveguides. The second differential electrode pair has a second length proximate to the third and fourth waveguides. The first length is different from the second length. In some embodiments, the first and second waveguides are coupled to an optical signal transmitter having a dispersion. The engineered chirp is opposite to the dispersion.

The techniques may be described in the context of positive and negative electrodes, positive and negative electrical signals (e.g., voltages), positive and negative inputs, and positive and negative outputs. However, such electrodes, voltages, inputs, and outputs carry or are signals that are opposite in polarity with respect to a reference. Stated differently, positive and negative refer to polarity with respect to a reference. In some embodiments, the reference is ground. In some embodiments, the reference is a nonzero voltage. In some embodiments, the reference is constant. In some embodiments, the reference may be slowly varying. In such embodiments, the positive voltage, or signal, has the opposite polarity with respect to the reference as the negative voltage, or signal. Thus, the terms "positive" and "negative" simply indicate that the signals are opposite in polarity with respect to the reference. There is no requirement that the "positive" signal remain positive with respect to the reference or that the "negative" signal remains negative with respect to the reference. Further, although described as ground, in some embodiments, the ground may include a slowly varying voltage. In addition, various features of the electro-optic devices are described herein. One or more of these features may be combined in manners not explicitly described herein.

Figure 1A:
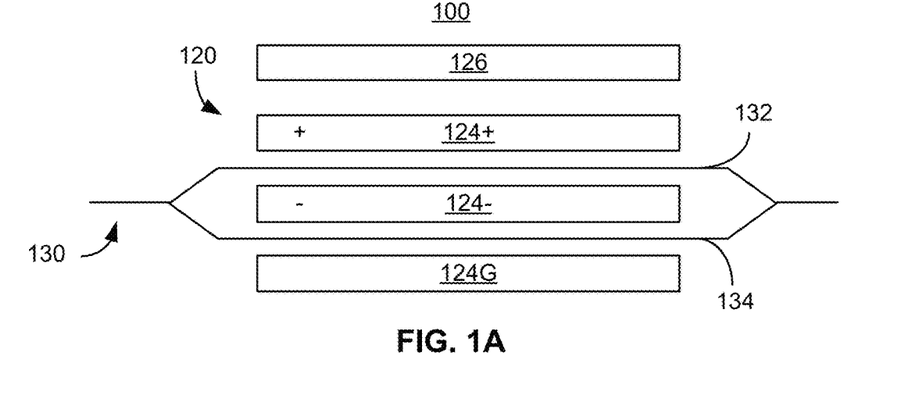
FIGS. 1A-1C depict embodiments of electro-optic devices having engineered chirp.
Figure 1B:
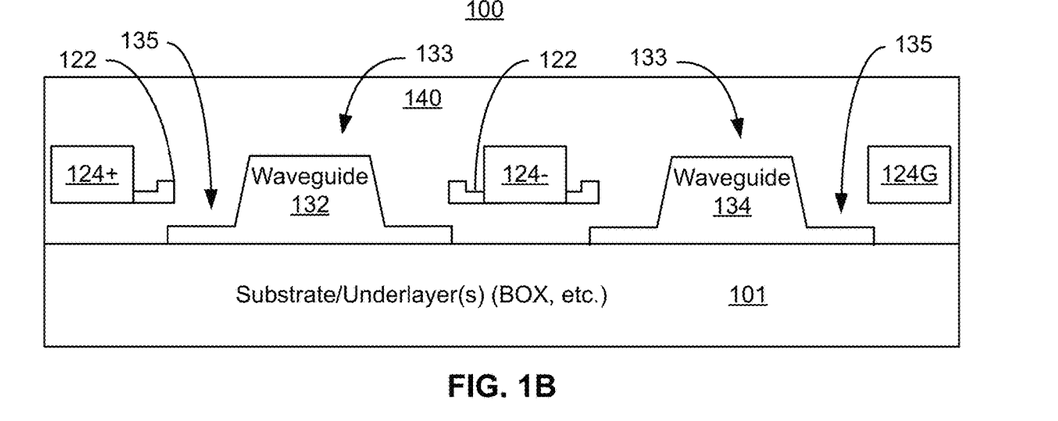
Figure 1C:
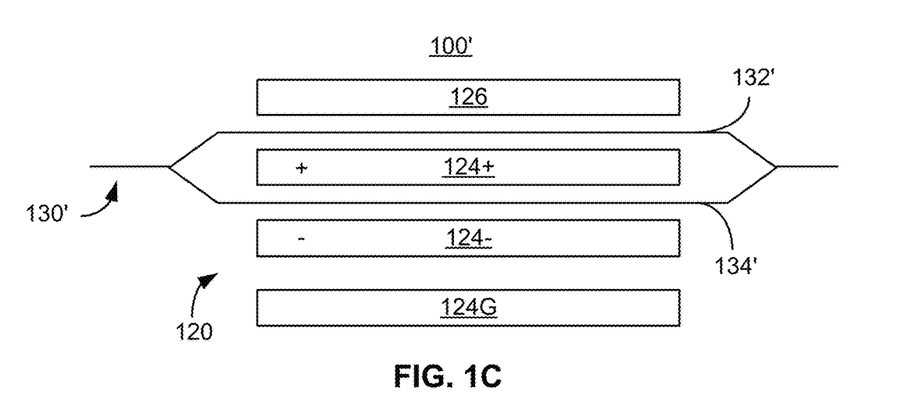

FIGS. 1A-1C depict embodiments of electro-optic devices 100 and 100' having engineered chirp. FIG. 1A depicts a plan view of a portion of electro-optic device 100, while FIG. 1B depicts a cross-sectional view of a portion of electro-optic device 100. FIG. 1C depicts a plan view of portion of electro-optic device 100'. For clarity, not all components are shown and FIGS. 1A-1C are not to scale. FIGS. 1A-1C may be considered to show portions of electro-optic devices 100 and 100'. For example, drivers, voltage sources, the source of the optical signal, and other portions of such a system are not shown.

Referring to FIGS. 1A-1B, electro-optic device 100 includes electrodes 120, waveguide 130, and cladding 140 that reside on substrate structure 101. Waveguide 130 includes arms 132 and 134. In some embodiments, arms 132 and 134 may be considered separate waveguides. Waveguide 130 may be configured as a Mach-Zehnder interferometer. Electrodes 120 include ground electrode 126 and an electrode trio 124. Electrode trio 124 includes differential electrodes 124+ and 124− and ground electrode 124G. Thus, differential electrodes 124+ and 124− may carry signals that are opposite in polarity (e.g. one hundred and eighty degrees out of phase). Differential electrode 124+ may be considered to carry the positive voltage signal, while differential electrode 124− carries a negative voltage signal (i.e., a signal of opposite polarity to the positive voltage signal). The frequency of the electrical signals carried by differential electrodes 124+ and 124− may be high, for example in the 100 kHz through 100 GHz (or higher) range. Ground electrode 124G may also have a slow varying potential or a constant bias (zero or nonzero) voltage. Waveguide arm 132 is between differential electrodes 124+ and 124−, while waveguide arm 134 is between signal electrode 124− and ground electrode 124G. Electrode 124− is depicted as being between waveguide arms 132 and 134. In some embodiments, two electrodes carrying the same signal may be used instead of a single electrode 124−.

FIG. 1B depicts a cross-sectional view of electro-optic device 100. Each waveguide arm 132 and 134 includes ridge portion 133 and slab portion 135. In some embodiments, slab portion 135 may be omitted from arm 132 and/or 134. The optical modes carried by waveguide arms 132 and 134 are generally well confined to ridge portion 133. Also shown are electrode trio 124 (positive electrode 124+, negative electrode 124− and ground electrode 124G). In some embodiments, extensions 122 may extend from differential electrodes 124. Although not shown in FIG. 1B, in some embodiments, ground electrode 124G may include extensions. Extensions 122 may allow for accumulation of charges closer to arms 132 and 134 (e.g., ridge 133) of waveguide 130. These charges are due to the electrode signals carried by differential electrodes 124+ and 124−. Thus, extensions 122 may enhance the electric field experienced by ridge 133 and improve modulation of the optical signal carried by arms 132 and 134. Embodiments of analogous electrodes may be found in co-pending U.S. patent application Ser. No. 17/843,906, entitled ELECTRO-OPTIC DEVICES HAVING ENGINEERED ELECTRODES, which is a continuation of U.S. patent application Ser. No. 17/102,047 entitled ELECTRO-OPTIC DEVICES HAVING ENGINEERED ELECTRODES, filed Nov. 23, 2020, which claims priority to U.S. Provisional Patent Application No. 62/941,139 entitled THIN-FILM ELECTRO-OPTIC MODULATORS filed Nov. 27, 2019, U.S. Provisional Patent Application No. 63/033,666 entitled HIGH PERFORMANCE OPTICAL MODULATORS filed Jun. 2, 2020, and U.S. Provisional Patent Application No. 63/112,867 entitled BREAKING VOLTAGE-BANDWIDTH LIMIT IN INTEGRATED LITHIUM NIOBATE MODULATORS USING MICRO-STRUCTURED ELECTRODES filed Nov. 12, 2020, all of which are incorporated herein by reference for all purposes.

Also shown in FIG. 1B is substrate structure 101. In some embodiments, substrate structure 101 includes an underlying substrate (e.g., silicon) and a thick buried oxide underlayer between slab 135 and the underlying substrate. For example, the buried oxide underlayer may be at least three micrometers thick, at least five micrometers thick, at least seven micrometers thick, and not more than fifteen micrometers thick. In some embodiments, the buried oxide layer includes or consists of silicon dioxide. Other components may be present in substrate structure 101 but are not shown for simplicity.

Referring to FIGS. 1A-1B, waveguide 130 (and thus each arm 132 and 134) includes at least one optical material possessing an electro-optic effect. In some embodiments, waveguide 130 includes thin film lithium containing (TFLC) electro-optic materials, such as thin film lithium niobate (TFLN) and/or thin film lithium tantalate (TFLT). In some embodiments, waveguide 130 consists of TFLN and/or TFLT. For example, the thickness of the electro-optic layer(s) form which waveguide 130 are formed is not more than three micrometers prior to fabrication of waveguides 130. In some embodiments, this thickness is not more than 1.5 micrometer or not more than one micrometer. In some embodiments, the thickness is not more than seven hundred nanometers or not more than five hundred nanometers. In some embodiments, the thickness is at least one hundred nanometers. Other thicknesses are possible. The thickness of waveguides 130 is less than or equal to the thickness of the as-provided electro-optic layer. For example, the thickness of waveguides 130 may be on the order of a few hundred nanometers or less.

Although primarily described in the context of (TFLC) electro-optic materials, such as thin film lithium niobate (TFLN) and thin film lithium tantalate (TFLT), other nonlinear optical materials may be used in the optical devices described herein. For example, other ferroelectric nonlinear (e.g. second order) optical materials may also be desired to be used in waveguides 130. Such ferroelectric nonlinear optical materials may include but are not limited to potassium niobate (e.g. $KNbO_3$), gallium arsenide (GaAs), potassium titanyl phosphate (KTP), lead zirconate titanate (PZT), and barium titanate ($BaTiO_3$). The techniques described may also be used for other nonlinear ferroelectric optical materials, particularly those which may otherwise be challenging to fabricate. For example, such nonlinear ferroelectric optical materials may have inert chemical etching reactions using conventional etching chemicals such as fluorine, chlorine or bromine compounds.

In some embodiments, the optical material(s) used in waveguide 130 are nonlinear. As used herein, a nonlinear optical material exhibits the electro-optic effect and has an effect that is at least (e.g. greater than or equal to) 5 picometer/volt. In some embodiments, the nonlinear optical material has an effect that is at least 10 picometer/volt. In some such embodiments nonlinear optical material has an effect of at least 20 picometer/volt. The nonlinear optical material experiences a change in index of refraction in response to an applied electric field. In some embodiments, the nonlinear optical material is ferroelectric. In some embodiments, the electro-optic material effect includes a change in index of refraction in an applied electric field due to the Pockels effect. Thus, in some embodiments, optical materials possessing the electro-optic effect in one or more the ranges described herein are considered nonlinear optical materials regardless of whether the effect is linearly or nonlinearly dependent on the applied electric field. The nonlinear optical material may be a non-centrosymmetric material. Therefore, the nonlinear optical material may be piezoelectric. Such nonlinear optical materials may have inert chemical etching reactions for conventional etching using chemicals such as fluorine, chlorine or bromine compounds. In some embodiments, the nonlinear optical material(s) include one or more of LN, LT, potassium niobate, gallium arsenide, potassium titanyl phosphate, lead zirconate titanate, and barium titanate. In other embodiments, other nonlinear optical materials having analogous optical characteristics may be used.

In some embodiments, waveguide arms 132 and 134 are low optical loss waveguides. For example, waveguide arms 132 and 134 may each have a total optical loss of not more than 10 dB through the portion of waveguide 130 (e.g. when biased at maximum transmission and as a maximum loss) in proximity to differential electrodes 124+ and 124−. The total optical loss is the optical loss in a waveguide through a single continuous electrode region (e.g. as opposed to multiple devices cascaded together). In some embodiments, waveguide 130 has a total optical loss of not more than 8 dB. In some embodiments, the total optical loss is not more than 4 dB. In some embodiments, the total optical loss is less than 3 dB. In some embodiments, the total optical loss is less than 2 dB. In some embodiments, waveguides 130 has an optical loss of not more than 3 dB/cm (e.g. on average). In some embodiments, the nonlinear material(s) in waveguides 130 has an optical loss of not more than 2.0 dB/cm. In some such embodiments, waveguide 130 has an optical loss of not more than 1.0 dB/cm. In some embodiments, waveguide 130 has an optical loss of not more than 0.5 dB/cm. In some embodiments, the low optical losses are associated with a low surface roughness of the side walls of waveguides 130.

Waveguide 130, and thus waveguide arms 132 and 134, may have improved surface roughness. For example, the short range root mean square surface roughness of a sidewall of the ridge 133 may be less than ten nanometers. In some embodiments, this root mean square surface roughness is not more than five nanometers. In some cases, the short range root mean square surface roughness does not exceed two nanometers. In some embodiments, the height of ridge 133 is selected to provide a confinement of the optical mode such that there is a 10 dB reduction in intensity from the intensity at the center of ridge 133 at ten micrometers from the center of ridge 133. For example, the height of ridge 133 is on the order of a few hundred nanometers in some cases. However, other heights are possible in other embodiments. Various other optical components may be incorporated into waveguide 130 to provide the desired functionality. For example, waveguide 130 may have wider portion(s) (not shown in FIGS. 1A-1B) for accommodating multiple modes.

In operation, an optical signal is provided to waveguide 130. The optical signal is split and provided to waveguide arms 132 and 134. In some embodiments, optical signals are evenly split between arms 132 and 134 (e.g. half of the intensity to each arm 132 and 134). In other embodiments, the optical signals may be split differently. Differential electrical signals (e.g., complementary signals) are provided to differential electrodes 124+ and 124−. These differential signals may be one hundred and eighty degrees out-of-phase. The differential electrode signals carried by differential electrodes 124+ and 124− modulate the optical signal in waveguide arm 132 in regions where electrodes 124+ and 124− are proximate to waveguide arm 132. The electrical signal carried by differential electrode 124− modulates the optical signal in waveguide arm 134 in regions where differential electrode 124− is proximate to arm 134 of waveguide 130. For example, the location of portions of waveguide 130 may be further from electrodes 120 than appears in the plan view of FIG. 1A. For example, portions of waveguide 130 may be separated by a distance out of the plane of the page for FIG. 1A (e.g., portions of waveguide 130 may be buried deeper in the device 100 or portions of electrode trio 124 may be further from substrate structure 101). The modulated optical signal for each arm 132 and 134 of a waveguide 130 may be recombined and then output.

Electro-optic device 100 may have engineered chirp. Chirp refers to frequency components generated through modulation that do not contribute to amplitude modulation. For example, pure phase modulation generates sidebands without adding amplitude modulation. In intensity modulations such as Mach Zehnder or Michelson interferometers, chirp can be generated by performing different modulation on the two modulator arms that do not cancel each other in the beam splitter of the interferometer. While chirp on its own does not generate amplitude modulation, by propagating through a dispersive medium the relative spectral phase changes. This phase change in turn can lead to amplitude modulation or distortion of modulated waveforms. Therefore the ability to control chirp in electro-optic modulation is desirable. Electro-optic device 100 includes waveguide arms 132 and 134 and electrode trio 124 that are configured to provide such controlled chirp.

For electro-optic materials (e.g., TFLC materials), the electric field may produce refractive index changes through the electro-optic effect. For TFLC materials, the modulation depends upon the magnitude and direction of the electric field. In electro-optic device 100, the electric fields generated by differential electrodes 124+ and 124− and by electrode 124− and ground electrode 124G are in opposite direction. In addition, the electrodes 124+, 124−, and 124G may be configured to provide different amounts (i.e. different magnitudes) of modulation (in addition to different directions of modulation) of the optical signals in waveguide arms 132 and 134. Consequently, a controlled, or engineered, chirp may be provided in electro-optic device 100.

More specifically, waveguide arm 132 is between differential electrodes 124+ and 124−. Differential electrodes 124+ and 124− carry electrical signals of opposite polarity (e.g. complimentary electrical signals). The electrical signals carried by electrodes 124+ and 124− generate an electric field between differential electrodes 124+ and 124−.

The electric field is in the region of waveguide arm 132 and modulates the index of refraction of waveguide arm 132. Thus, the optical signal carried by waveguide arm 132 is modulated. Differential electrodes 124+ and 124− carrying complementary electrical signals form a push-pull configuration for the intensity modulation. As a result, the required voltage to drive waveguide arm 132 to have the desired modulation (e.g. the desired V-pi) may be reduced.

In contrast, waveguide arm 134 is between negative differential electrode 124− and ground electrode 124G. The electrical signal carried by negative differential electrode 124− generates an electric field between electrodes 124− and 124G. This electric field modulates the index of refraction of waveguide arm 134. Consequently, the optical signal carried by waveguide arm 134 is modulated. However, the electric field between electrodes 124− and 124G is in the opposite direction to the electric field between differential electrodes 124+ and 124−. Moreover, differential electrode 124− and ground 124G do not form a push-pull configuration. Consequently, the voltage required to drive waveguide arm 134 may not be reduced.

The modulation provided to the optical signal in arm 132 or 134 of waveguide 130 depends upon the electric field and the length of the waveguide arms 132 and/or 134 along which the electric field is applied. The electric field applied depends upon the electrical signal through differential electrodes 124+ and 124−, the distances between electrodes 124+ and 124− and between electrodes 124− and 124G. For example, if the gap between electrodes 124+ and 124− is the same as the gap between electrodes 124− and 124G and electrical signals having the same magnitude and opposite polarity (i.e. complementary, differential signals) are driven through electrodes 124+ and 124−, then the modulation across waveguide arm 132 may be twice that of the modulation across waveguide arm 134 and in the opposite direction. Thus, by controlling the gap between electrodes 124+ and 124−, the gap between electrodes 124− and 124G, the electrical signal driven through electrodes 124+ and 124−, and the length along which the electrode trio 124 is in proximity to waveguide arms 132 and 134 (e.g. the V-pi*L for the waveguide arms 132 and 134) the chirp introduced into waveguide 130 may be controlled.

For example, suppose differential electrodes 124+ and 124− carry a particular electrode signal and a separated by a gap (i.e. provide an electric field for waveguide arm 132) that generates a modulation having magnitude M1 in waveguide arm 132. Electrodes 124− and 124G are configured such that the electric field for waveguide arm 134 generates a modulation having magnitude M2 in waveguide arm 132. Electro-optic device 100 thus has a chirp parameter, C, given by $C=(M1-M2)/(M1+M2)$. In some embodiments, electro-optic device 100 is configured to have a chirp parameter of at least 0.1 and not greater than 0.9 or not greater than −0.1 and at least −0.9 (i.e., $-0.9 \leq C \leq -0.1$ or $0.1 \leq C \leq 0.9$). Thus, the chirp, or chirp parameter, may be engineered for electro-optic device 100.

FIG. 1C depicts electro-optic device 100'. Electro-optic device 100' includes waveguide 130' and electrodes 120 including electrode trio 124 and ground electrode 126, Electrode trio 124 includes differential electrodes 124+ and 124− and ground electrode 124G that are analogous to differential electrodes 124+ and 124− and ground electrode 124G of electro-optic device 100. Waveguide 130' is analogous to waveguide 130. Thus, waveguide arms 132' and 134' are analogous to waveguide arms 132 and 134. However, in electro-optic device 100', arm 132' is between ground electrode 126 and positive differential electrode 124+, while waveguide arm 134' is between differential electrodes 124+ and 124−. Similarly, electrode 124+ is between waveguide arms 132 and 134. In some embodiments, two electrodes carrying the same signal may be used instead of a single electrode 124+.

Electro-optic device 100' operates in an analogous manner to electro-optic device 100. However, waveguide arm 134' is exposed to the push-pull configuration, while waveguide arm 132' is not. Thus, the modulation, and chirp, for electro-optic device 100' is in the opposite direction as that of electro-optic device 100. For example, for equally spaced electrodes 124+, 124−, and 126, the electric field applied to waveguide arm 134' is approximately twice the magnitude and in the opposite direction of the electric field applied to waveguide arm 132'. By configuring the gaps between electrodes 120, the signal through differential electrodes 124+ and 124−, and the lengths of waveguide arms 132' and 134' along which the electric field is applied, the modulation to each arm 132' and 134' is controlled. A controlled chirp having an opposite direction may be provided by electro-optic device 100'.

Thus, electro-optic devices 100 and 100' may provide an engineered chirp to waveguides 130 and 130'. Stated differently, electro-optic devices 100 and 100' may have tailored chirp parameters. Controlling the chirp introduced into waveguides 130 and 130' may improve performance. For example, chirp introduced in other components may be accounted for. In one such example, dispersion in optical fibers to which waveguide 130 or 130' are coupled may be mitigated by introducing in waveguide 130 and 130' chirp opposite to the dispersion. As a result, the optical signal may be better maintained and longer transmission distances may be achieved. Furthermore, the chirp induced using electro-optic devices 100 and 100' may not change the loss in waveguides 130 and/or 130'. Consequently, the technique for inducing chirp may not change the extinction ratio of the Mac-Zehnder interferometer configuration of electro-optic devices 100 and/or 100'. The extinction ratio of electro-optic devices 100 and/or 100' may be maintained to be at least 10 dB, at least 15 dB, at least 20 dB or at least 25 dB in various embodiments. In some embodiments, the extinction ratio may be less than 100 dB. As a result, the chirp may be engineered without adversely affecting the extinction ratio of electro-optic devices 100 and/or 100'. Consequently, performance of a system utilizing electro-optic devices 100 and/or 100' may be improved.

Figure 2:
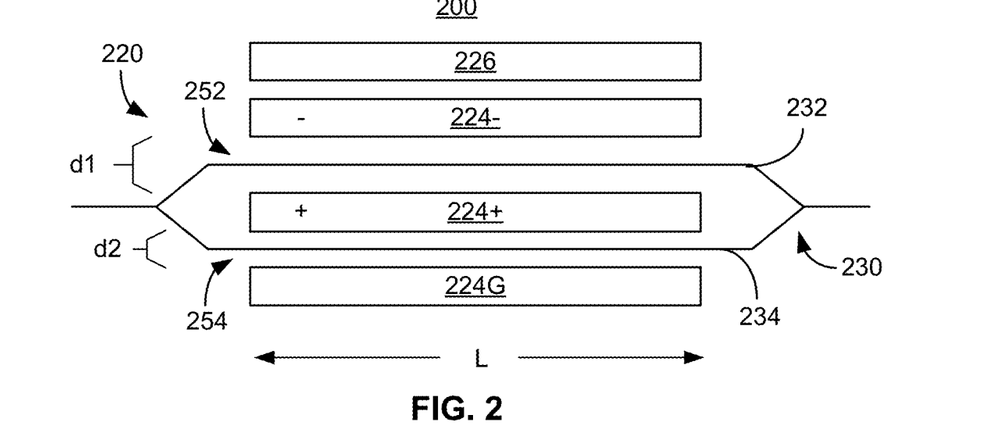
FIG. 2 depicts an embodiment of an electro-optic device having engineered chirp.

FIG. 2 depicts a plan view of an embodiment of electro-optic device 200 having engineered chirp. For clarity, not all components are shown and FIG. 2 is not to scale. FIG. 2 may be considered to show portions of electro-optic device 200. For example, drivers, voltage sources, the source of the optical signal, and other portions of such a system are not shown. Electro-optic device 200 is analogous to electro-optic device 100 and, therefore, functions in a similar manner.

Electro-optic device 200 includes electrodes 220 and waveguide 230, that are analogous to electrodes 120 and waveguide 130. Thus, waveguide 230 includes or consists of TFLC materials such as TFLN and/or TFLT. Electro-optic device 200 may also include cladding and a substrate structure analogous to cladding 140 and substrate structure 101. Waveguide 230 includes arms 232 and 234 that are analogous to arms 132 and 134 of waveguide 100. Similarly, electrodes 220 includes ground electrode 226 and electrode trio 124 that are analogous to ground electrode 126 and electrode trio 124. Electrode trio 224 includes differential electrodes 224+ and 224− and ground electrode 224G that are analogous to differential electrodes 124+ and 124− and ground electrode 124G. Thus, differential electrodes 224+ and 224− may carry signals that are opposite in polarity. The frequency of the electrical signals carried by differential electrodes 224+ and 224− may be high, for example in the 100 kHz through 100 GHz (or higher) range. Ground electrode 224G may also have a slow varying potential or a constant bias (zero or nonzero) voltage. Waveguide arm 232 is between differential electrodes 224+ and 224−, while waveguide arm 234 is between signal electrode 224− and ground electrode 224G.

Although waveguide arm 232 is between differential electrodes 224− and 224+, positive electrode 224+ is between waveguide arms 232 and 234. This is different from the locations of the positive electrode 124+ and negative electrode 124− in electro-optic device 100. However, waveguide arm 232 and electrodes 224+ and 224− are still in a push-pull configuration. Further, waveguide arm 234 is between electrode 224+ and ground electrode 224G. Thus, optical signals through waveguide arms 232 and 234 are modulated in an analogous manner to the optical signal through waveguide arms 132 and 134. However, the electric fields may be in the opposite direction.

Also explicitly labeled are gaps 252 and 254 having widths d1 and d2, respectively. Gap 252 is between differential electrodes 224+ and 224− and is traversed by waveguide arm 232. Gap 254 is between differential electrode 224+ and ground electrode 224G and is traversed by waveguide arm 234. In the embodiment shown, gap 252 between differential electrodes 224+ and 224− is wider than gap 254 between electrodes 224+ and 224G (i.e. d1>d2). However, the gap length(s) d1 and/or d2 may be different. For example, gap 252 may be the same size as gap 254 (d1=d2), smaller than gap 254 (d1<d2), or a smaller amount larger than gap 254 (d1>d2, but by a smaller amount). Gaps 252 and 254 are each not more than twenty micrometers wide in some embodiments. In some embodiments, each of gaps 252 and 254 may have length of at least 2 micrometers (d1, d2 each at least 2 micrometers). In some embodiments, gap 252 and/or gap 254 has a length of at least 2.5 micrometers (d1 and/or d2 at least 2.5 micrometers). Each gap 252 and 254 may have a width that is not more than ten micrometers (d1, d2 each not more than 10 micrometers). In some embodiments, gap 252 and/or gap 254 is not more than six micrometers (d1 and/or d2 not more than 6 micrometers).

Electro-optic device 200 operates in an analogous manner to electro-optic devices 100 and/or 100'. Thus, a controlled chirp may be introduced. The electric field at waveguide arms 232 and 234 may be proportional to V-pi*L, where V is the magnitude of the electrode signals and L is the length along which the electrode trio 234 is proximate to waveguide arms 232 and 324. By controlling gaps 252 and 254 and/or V-pi*L, the modulation and thus the chirp can be configured. In some embodiments, gap 254 between the differential electrode 224+ and ground may be desired to be at a minimum without inducing significant optical loss to maintain highest electro-optic modulation efficiency. In some embodiments, gap 254 between signal electrode 224+ and ground electrode 224G may be much wider to achieve more extreme chirp at the cost of electro-optic modulation efficiency. One or both of gaps 252 and 254 may be set to have widths in the above (or other) ranges to change the electric field at waveguide arms 232 and 234 and, therefore, the chirp. The electric field at waveguide arms 232 and 234 is also proportional to V-pi*L, where V is the magnitude of the electrode signals and L is the length along which the electrode trio 234 is proximate to waveguide arms 232 and 324. Thus, by controlling gaps 252 and 254 and/or V-pi*L, the modulation and thus the chirp can be configured.

For example, if gaps 252 and 254 are the same size (d1=d2), then the electric field experienced by waveguide arm 232 is approximately twice the electric field experienced by waveguide 234 for a differential signal driven through differential electrodes 224+ and 224−. Thus, a chirp is introduced. In this example, d1 and d2 are set such that M1 is twice as large as M2. In such embodiments, electro-optic device 200 has chirp parameter of C=1/3. If a smaller magnitude chirp is desired, then during fabrication, gap 252 is increased in size and/or gap 254 is decreased in size. Gaps 252 and/or 254 may be configured such that electro-optic device 200 has a chirp parameter of at least 0.1 and not greater than 0.9 or not greater than −0.1 and at least −0.9, where C=(M1−M2)/(M1+M2) (−0.9≤C≤−0.1 or 0.1≤C≤0.9). For example, in one embodiment, gap 252 may have a width of four micrometers, while gap 254 has a width of three micrometers. In another example, if gap 252 between the signal (the differential) electrodes 124+ and 124− is twice gap 252 between signal electrode 224+ and ground 224G, then approximately zero chirp may be introduced. Depending upon the relative widths of the gaps, positive or negative chirps may be introduced. If gap 252 between the differential (i.e. signal) electrodes 224+ and 224− is greater than twice gap 254 between signal electrode 224+ and ground electrode 224G, the chirp introduced has one sign. If gap 252 between differential electrodes 224+ and 224− is less than twice gap 254 between signal electrode 224+ and ground electrode 224G, the chirp introduced has the opposite sign. In some embodiments, the electrical signal applied to differential electrodes 224+ and 224− is 0.8V-1V differential peak-to-peak. In some embodiments, the signal applied may be lower than 0.8 volts peak-to-peak. In some embodiments, the signal is greater than 1V. For example, the signal may be 1.5V differential peak-to-peak. However, the signal may be desired to be not more than 3.5V differential peak-to-peak.

Thus, gaps 252 and 254 between the electrodes 224− and 224+ and electrodes 224+ and 224G may be configured to control chirp independently from the signal through differential electrodes 224+ and 224−. In some embodiments the width selected for gaps 252 and 243 may change the sign of the chirp, but not the magnitude. In some embodiments, the magnitude of the chirp may also be controlled. Consequently, electro-optic device 200 may share the benefits of electro-optic devices 100 and/or 100'. For example, the engineered chirp introduced by electro-optic device 200 may be used to account for chirp and/or dispersion introduced in other components. In one example, dispersion due to optical fibers (not shown) may be mitigated. As a result, the optical signal may be better maintained and longer transmission distances may be achieved. Further, the introduction of controlled chirp may not adversely affect the extinction ratio of electro-optic device 200. Consequently, performance of a system utilizing electro-optic device 200 may be improved.

Figure 3:
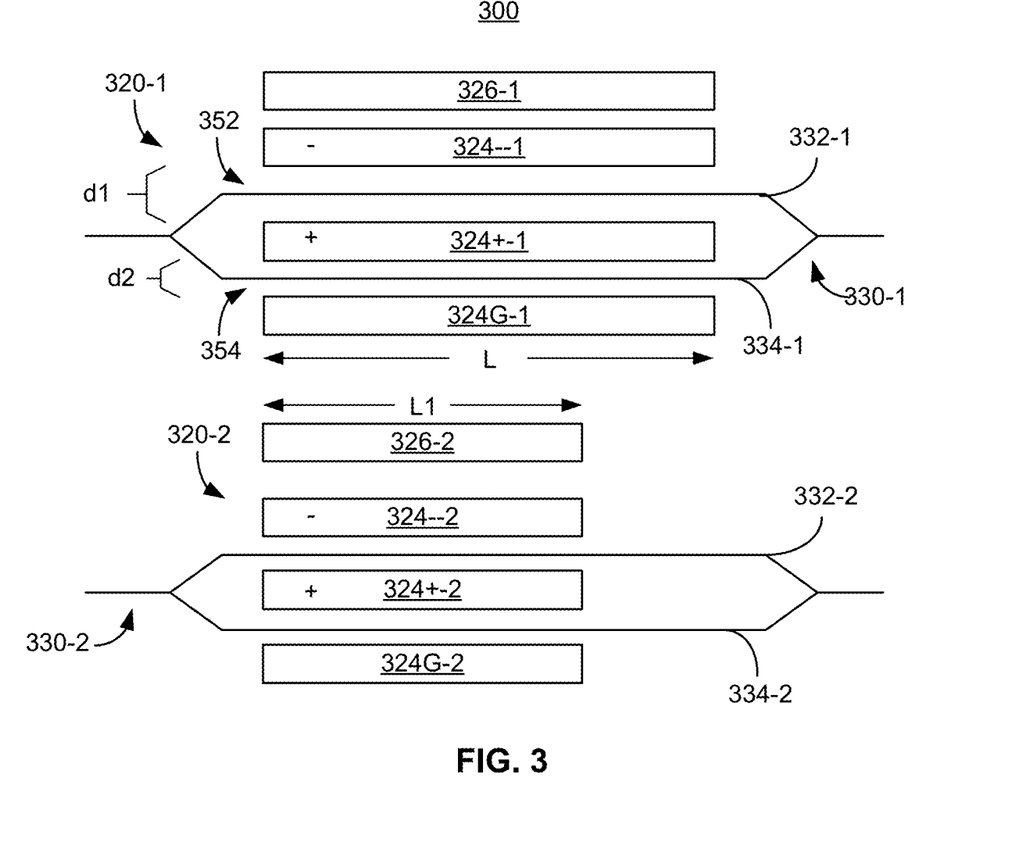
FIG. 3 depicts an embodiment of an electro-optic device having engineered chirp.

FIG. 3 depicts a plan view of an embodiment of electro-optic device 300 having engineered chirp. For clarity, not all components are shown and FIG. 3 is not to scale. FIG. 3 may be considered to show portions of electro-optic device 300. For example, drivers, voltage sources, the source of the optical signal, and other portions of such a system are not shown. Electro-optic device 300 includes two devices, each of which is analogous to device(s) 100, 100', and/or 200. Thus, electro-optic device 300 includes waveguides 330-1 and 330-2 (collectively or generically waveguide(s) 330 or waveguide 330-i). Each waveguide 330-i (where i is 1 or 2)

includes arms 332-*i* and 334-*i* (collectively or generically arm(s) 332 and 334). Electro-optic device also includes electrodes 320-*i* (collectively or generically electrodes 320) including ground electrode 326-*i* (collectively or generically ground electrode 326) and electrode trio 324-*i* (collectively or generically electrode trio 324), where i is 1 or 2. Each trio 324-*i* includes differential electrodes 324+-*i* and 324--*i* (collectively or generically differential electrodes 324+ and 324-) and ground electrodes 324G-i (collectively or generically ground electrode 324G), where i is 1 or 2. Waveguide arm 332 is between differential electrodes 324+ and 324-. Waveguide arms 334 are between differential electrodes 324+ and ground electrode 324G.

Electrodes 320 and waveguides 330 are analogous to electrodes 120, 220 and 320 and waveguides 130, 130', and 230. Thus, waveguides 330 includes or consists of TFLC materials such as TFLN and/or TFLT. Electro-optic device 300 may also include cladding and a substrate structure analogous to cladding 140 and substrate structure 101. Chirp for each waveguide 330 may be controlled in a manner analogous to that discussed for electro-optic devices 100, 100', and/or 200. For example, the gaps between electrodes 320, the signal applied to differential electrodes 324+ and 324-, and the lengths of electrodes 320 proximate to waveguide arms 332 and 334 can be engineered to provide the desired chirp.

More specifically, electrodes 320-1 and waveguide 330-1 are configured in an analogous matter to electrodes 220 and waveguide 230. Gaps 352 and 354 are analogous to gaps 252 and 254. Thus, waveguide 330-1 has an engineered chirp controlled by the widths of gaps 352 and 354. However, the reduction in the electric field between differential electrodes 324+-1 and 324--1 may affect the efficiency of modulation for waveguide 330-1. V-pi* for waveguide 330-1 is less it would be if gap 352 were narrower (e.g. the same as the gaps for electrodes 320-2). To address this change in efficiency, the lengths of electrodes may be configured. Electrodes 324+-2 and 324--2, 324G-2, and 326-2 having smaller gaps have a reduced length L1, while electrodes 324+-2 and 324--2, 324G-2, and 326-2 with larger gap 352 have lengths L>L1 in the region of waveguides 330. By reducing the length of differential electrodes 324+-2 and 324--2 to L1, V-pi*L for waveguide 330-2 has been reduced. In some embodiments, V-pi*L for waveguides 320-1 and 320-2 may be the same. Thus, gaps 352 and 354 may be used to engineer chirp and electrode lengths may be used to control V-pi.

Electro-optic device 300 may share the benefits of electro-optic devices 100, 100' and/or 200. For example, the engineered chirp introduced by electro-optic device 300 may be used to account for chirp and/or dispersion introduced in other components. In one example, dispersion due to optical fibers (not shown) may be mitigated. As a result, the optical signal may be better maintained and longer transmission distances may be achieved. Further, V-pi may also be controlled. In addition, the introduction of controlled chirp may not adversely affect the extinction ratio of electro-optic device 300. Consequently, performance of a system utilizing electro-optic device 300 may be improved.

Figure 4:
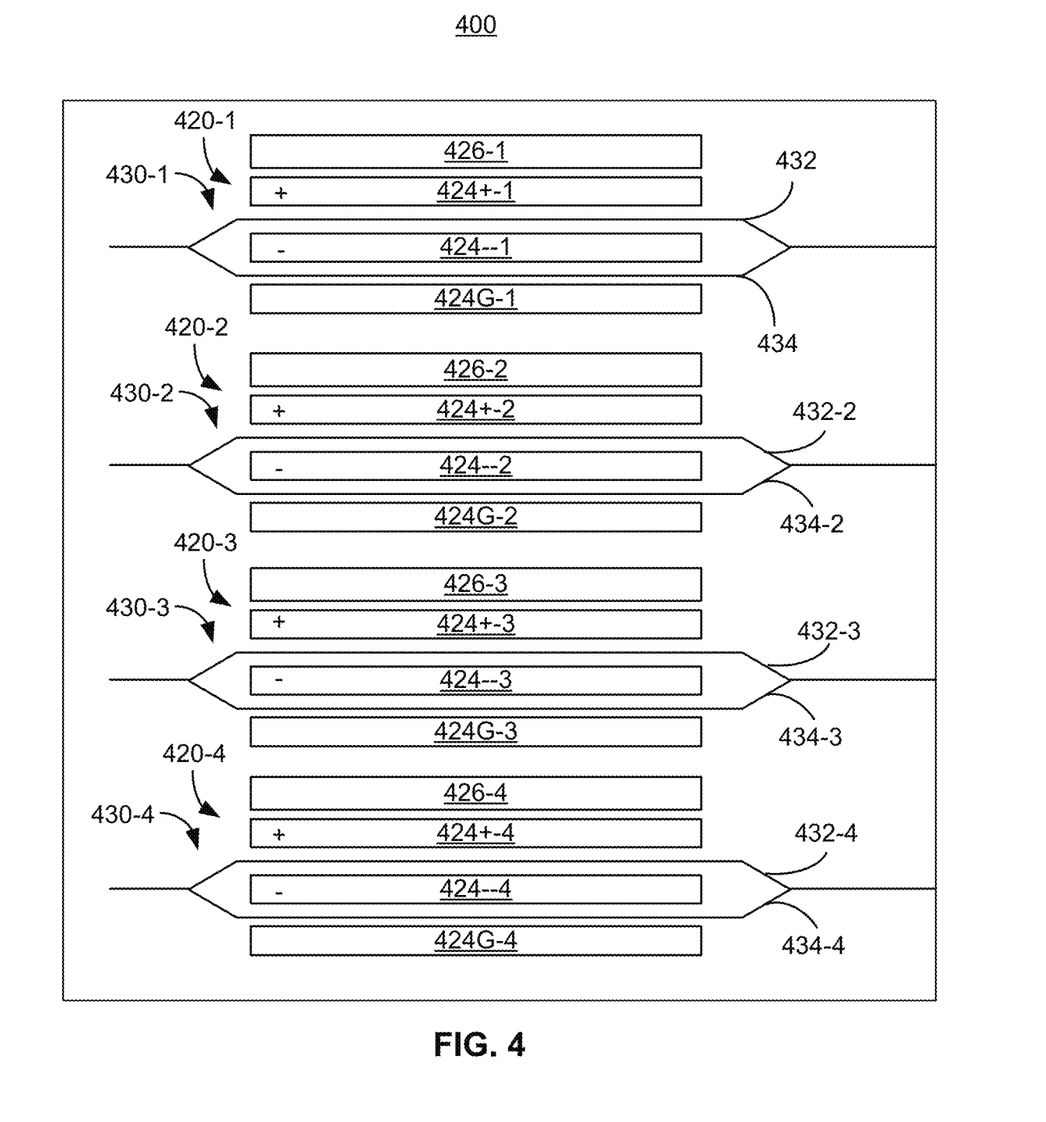
FIG. 4 depicts an embodiment of an electro-optic device having engineered chirp.
Figure 5:
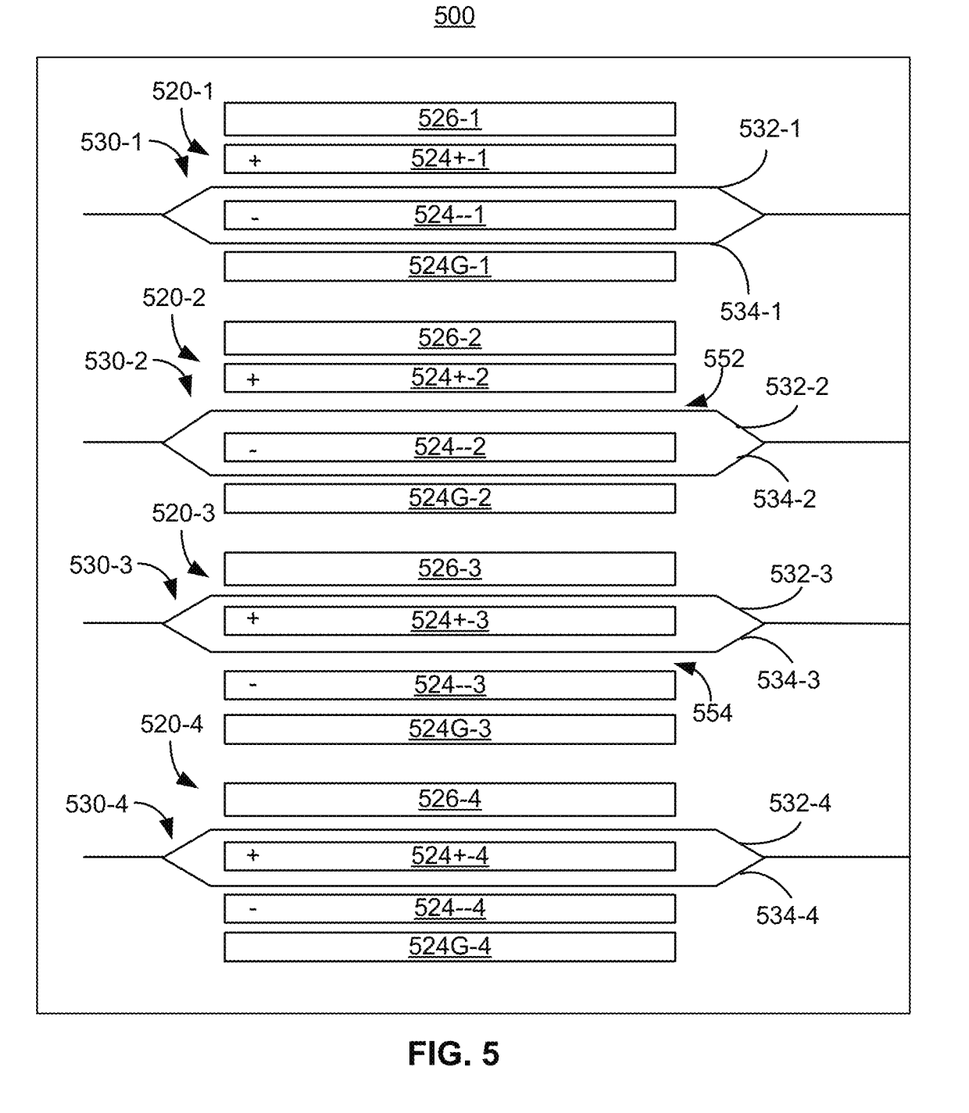
FIG. 5 depicts an embodiment of an electro-optic device having engineered chirp.
Figure 6:
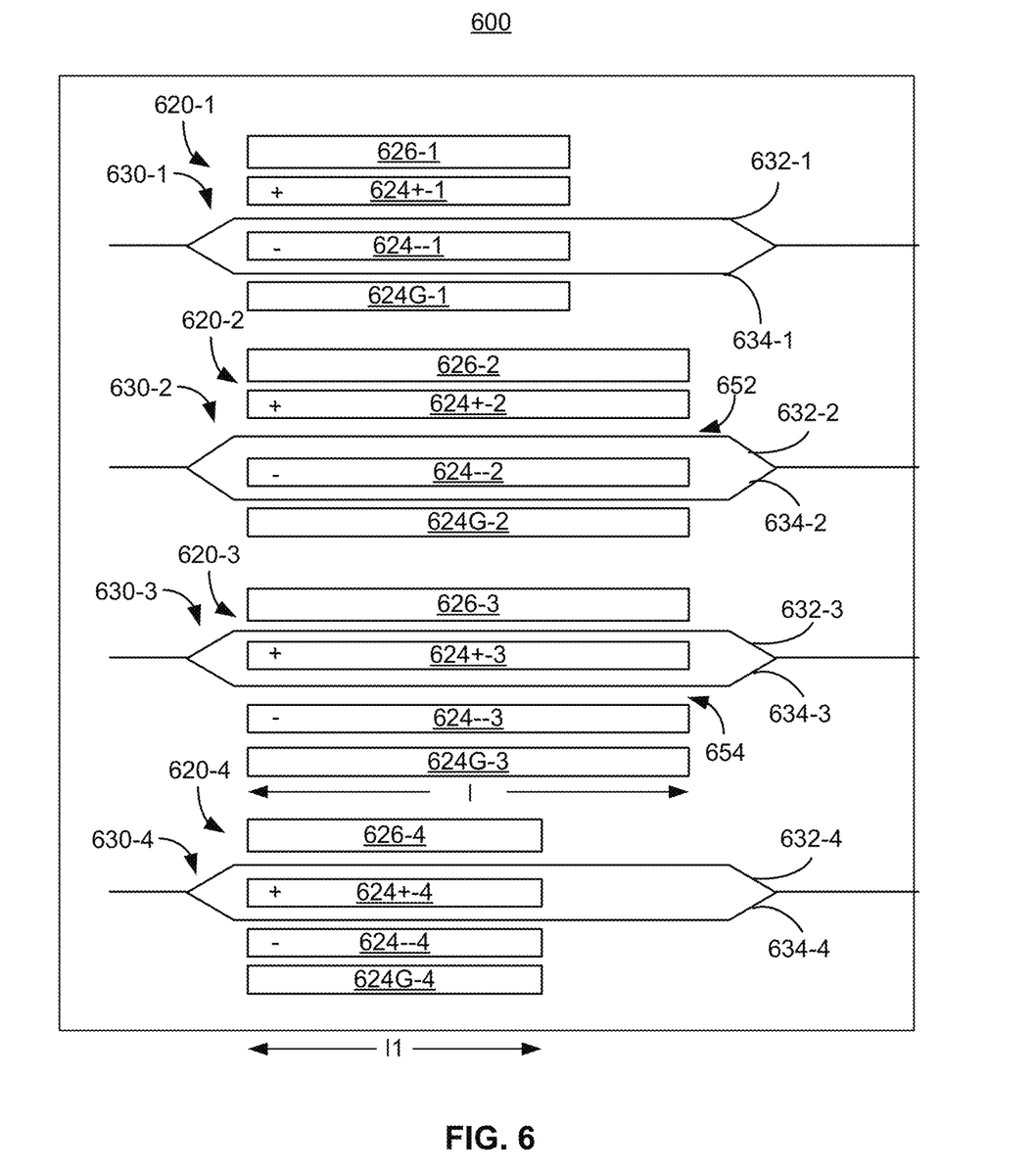
FIG. 6 depicts an embodiment of an electro-optic device having engineered chirp.

Although described in the context of one or two waveguides (or single pairs of waveguides/waveguide arms), multiple gaps, multiple waveguide pairs, and multiple electrode pairs may be used in some embodiments. For example, FIGS. 4-6 depict embodiments of electro-optic devices 400, 500, and 600 which combine aspects of multiple devices analogous to electro-optic devices 100, 100', 200, and/or 300. Other combinations that are not shown are also possible.

FIG. 4 depicts an embodiment of electro-optic device 400 having engineered chirp. For clarity, not all components are shown and FIG. 4 is not to scale. For simplicity, drivers, voltage sources, the source of the optical signal, and other portions of such a system are not shown. Electro-optic device 400 includes four devices, each of which is analogous to device(s) 100, 100', 200, and/or 300. Thus, electro-optic device 400 includes waveguides 430-1, 430-2, 430-3, and 430-4 (collectively or generically waveguide(s) 430 or waveguide 430-*i*). Each waveguide 430-*i* (where i is 1, 2, 3, or 4) includes arms 432-*i* and 434-*i* (collectively or generically arm(s) 432 and 434). Electro-optic device also includes electrodes 420-*i* (collectively or generically electrodes 420) including ground electrode 426-*i* (collectively or generically ground electrode 426) and electrode trio 424-*i* (collectively or generically electrode trio 424), where i is 1, 2, 3, or 4. Each trio 424-*i* includes differential electrodes 424+-*i* and 424--*i* (collectively or generically differential electrodes 424+ and 424-) and ground electrodes 424G-i (collectively or generically ground electrode 424G), where i is 1, 2, 3, or 4. Waveguide arm 432 is between differential electrodes 424+ and 424-. Waveguide arms 434 are between differential electrodes 424- and ground electrode 424G. Electrodes 420 and waveguides 430 are, therefore, analogous to electrodes 120, 220 and 320 and waveguides 130, 130', 230, and 330. Thus, waveguides 430 includes or consists of TFLC materials such as TFLN and/or TFLT. Electro-optic device 400 may also include cladding and a substrate structure analogous to cladding 140 and substrate structure 101. Chirp for each waveguide 430 may be controlled in the manner analogous to that discussed for electro-optic devices 100, 100', 200, and/or 300. For example, the gaps between electrodes 420, the signal applied to differential electrodes 424+ and 424-, and the lengths of electrodes 420 proximate to waveguide arms 432 and 434 can be engineered to provide the desired chirp.

In some embodiments, electro-optic device 400 is a four channel transmitter device that may use optical signals having four different wavelengths (one wavelength for each waveguide 430). Electro-optic device 400 may thus be considered to include four modulators (one for each waveguide 430). Electro-optic device 400 may improve transmission of optical signals. The wavelengths of the optical signals may be chosen such that when propagating through optical fibers, the optical signals experience positive (normal), negative (anomalous), or zero dispersion. For example, optical fiber(s) (not shown) coupled with electro-optic device 400 may have zero dispersion for optical signals having a 1311 nanometer wavelength, nonzero dispersion (e.g. negative) for optical signals having wavelengths above 1311 nanometers, and nonzero dispersion having the opposite sign (e.g. positive) for wavelengths below 1311 nanometers. Non-zero dispersion adversely affects data transmission quality, particularly for transmission over a long distance. To address this issue, controlled chirp may be introduced for one or more waveguides 430. The chirp introduced for each waveguide 430 may be determined by the wavelength of the optical signal carried by each waveguide 430 and the distance targeted. The controlled chirp provided by electro-optic device 400 counters some or all of the dispersion introduced by propagation in a corresponding optical fiber over a distance. Thus, electro-optic device 400 improves transmission of the four channels transmitted via optical device 400.

The effect of the controlled chirp may be understood as follows. Spectral chirp can be described in ps/nm, meaning a certain ps of chirp per nm bandwidth. The fiber dispersion parameter for a system describes how much chirp is added per kilometer of propagation, given in ps/nm/km. For example, assume that for an optical signal having a wavelength of 1350 nm, the fiber dispersion parameter is −3 ps/nm/km and the optical signal propagates for two kilometers. The chirp added by dispersion in the optical fiber is −6 ps/nm. Suppose the optical fiber is coupled with waveguide 430-2, which carries an optical signal having a wavelength of 1350 nm. In order to compensate for the fiber dispersion the modulator for waveguide 430-2 in electro-optic device 400 may produce +6 ps/nm spectral chirp for the optical signal. In such a case, the controlled chirp introduced by electro-optic device 400 and the dispersion in the optical fiber add up such that the optical signal at the destination has no chirp and no distortion. In practice the chirp introduced to control dispersion may be slightly more or less than +6 ps/nm. The chirp introduced to the optical signals in remaining waveguides 430-1, 430-3, and 430-4 may be similarly controlled. Thus, the use of electro-optic device 400 may improve transmission of optical signals.

An analogous technique can extend this chirp/dispersion control to a higher or lower number of channels. For more wavelengths (i.e. more channels), each channel has slightly different chirp and therefore uses different compensation introduced by optical device 400. For a SMF28e fiber, for example, typical distances of propagation (e.g. between links) are at least 1 km to not more than 50 km. In such a case, the dispersion may be between −5 ps/nm/km and +5 ps/nm/km. The chirp introduced may be desired to be between −5 ps/nm and +5 ps/nm (e.g. for a 1 km propagation length) to −250 ps/nm and +250 ps/nm (e.g. for a 50 km propagation distance). In some embodiments, the sign of the chirp introduced may be determined by the gaps selected for waveguide arms 432 and 434 (e.g., the gap between differential electrodes 424+ and 424−, the gap between the positive electrode 424+ and ground electrode 426, and the gap between negative electrode 424− and ground 424G). Thus, the chirp for each waveguide 430 (and thus each channel) may be independently controlled to improve transmission of optical signals. Electro-optic device 400 may thus share the benefits of electro-optic device(s) 100, 200, and/or 300. For example, each channel may have independently controlled chirp and the introduction of controlled chirp may not adversely affect the extinction ratio of the channel(s) of electro-optic device 400. Optical device 400 may thus introduce controlled chirp in each channel that compensates for dispersion in optical fibers coupled with waveguides 430. As a result, the optical signal may be better maintained and longer transmission distances may be achieved. Consequently, performance of an optical network using electro-optic device 400 may be improved.

FIG. 5 depicts an embodiment of an electro-optic device having engineered chirp. For clarity, not all components are shown and FIG. 5 is not to scale. For simplicity, drivers, voltage sources, the source of the optical signal, and other portions of such a system are not shown. Electro-optic device 500 is analogous to electro-optic device 400. Thus, four devices, each of which is analogous to device(s) 100, 100', 200, and/or 300, are included in electro-optic device 500. Another number of devices (i.e. channels) may be included in other embodiments.

Electro-optic device 500 includes waveguides 530-1, 530-2, 530-3, and 530-4 (collectively or generically waveguide(s) 530 or waveguide 530-$i$). Each waveguide 530-$i$ (where $i$ is 1, 2, 3, or 5) includes arms 532-$i$ and 534-$i$ (collectively or generically arm(s) 532 and 534). Electro-optic device also includes electrodes 520-$i$ (collectively or generically electrodes 520) including ground electrode 526-$i$ (collectively or generically ground electrode 526) and electrode trio 524-$i$ (collectively or generically electrode trio 524), where $i$ is 1, 2, 3, or 5. Each trio 524-$i$ includes differential electrodes 524+-$i$ and 524−-$i$ (collectively or generically differential electrodes 524+ and 524−) and ground electrodes 524G-i (collectively or generically ground electrode 524G), where $i$ is 1, 2, 3, or 5. Waveguide arm 532 is between differential electrodes 524+ and 524−. Waveguide arms 534 are between differential electrodes 524− and ground electrode 524G. Electrodes 520 and waveguides 530 are, therefore, analogous to electrodes 120, 220, 320 and 420 and waveguides 130, 130', 230, 330, and 430. Thus, waveguides 530 includes or consists of TFLC materials such as TFLN and/or TFLT. Electro-optic device 500 may also include cladding and a substrate structure analogous to cladding 140 and substrate structure 101. Chirp for each waveguide 530 may be controlled in a manner analogous to that discussed for electro-optic devices 100, 100', 200, 300, and/or 400. For example, the gaps between electrodes 520, the signal applied to differential electrodes 524+ and 524−, and the lengths of electrodes 520 proximate to waveguide arms 532 and 534 can be engineered to provide the desired chirp.

In electro-optic device, the locations of waveguide arms 532 and 534 as well as the gaps between electrodes 520 may be selected to provide the desired chirp for each channel. In electro-optic device 500, gap 552 between differential electrodes 524+-2 and 524−-2 and gap 554 between differential electrodes 524+-3 and 524−-3 are controlled to be different from (e.g. wider than) the other gaps between the remaining electrodes of electro-optic device 500. For waveguide 530-1, the gaps between electrodes 520-1 are the same. In addition, waveguide arm 532-1 is between differential electrodes 524+-1 and 524−-1, while waveguide arm 534 is between differential electrode 524−-1 and ground electrode 524G-1. Thus, the modulation of the optical signal for waveguide arm 532-1 is approximately twice the modulation for the optical signal for waveguide arm 534-1.

For waveguide 530-2, gap 552 between differential electrodes 524+-2 and 524−-2 is larger than the gap between differential electrode 524−-2 and ground electrode 524G-2. This changes the difference in modulation between waveguide arms 532-2 and 534-2. As long as gap 552 is not more than twice the remaining gaps for electrodes 520-2, the difference in modulation between waveguide arms 532-2 and 534-2 (and thus the chirp for waveguide 530-2) is reduced from that of waveguide 530-1. The optical signal in waveguide arm 532-2 still experiences greater modulation than the optical signal in waveguide arm 534-2.

For waveguide 530-3, waveguide arm 532-3 is between ground electrode 526-3 and positive differential electrode 524+-3. Waveguide arm 534-3 is between differential electrodes 524+-3 and 524−-3. In addition, gap 554 is wider than the remaining gaps between electrodes 520-3. This changes the difference in modulation between waveguide arms 532-3 and 534-3. As long as gap 554 is not more than twice the remaining gaps for electrodes 520-3, the difference in modulation between waveguide arms 532-3 and 534-3 (and thus the chirp for waveguide 530-3) is reduced in magnitude from that of waveguide 530-1. However, because of gap 554 and the placement of waveguide arms 532-3 and 534-3 between electrodes 520-3, the chirp has the opposite sign from the chirp introduced to the optical signal carried by waveguide 530-1.

For waveguide 530-4, waveguide arm 532-4 is between ground electrode 526-4 and positive differential electrode 524+-4. Waveguide arm 534-4 is between differential electrodes 524+-4 and 524--4. In addition, the gaps between electrodes 520-4 are all substantially the same. This changes the difference in modulation between waveguide arms 532-3 and 534-3. The modulation between waveguide arms 532-4 and 534-4 (and thus the chirp for waveguide 530-4) is substantially the same in magnitude as that of waveguide 530-1. However, because of the placement of waveguide arms 532-4 and 534-4 between electrodes 520-4, the chirp has the opposite sign from the chirp introduced to the optical signal carried by waveguide 530-1.

Thus, each waveguide 530 has a chirp that is individually controlled in both strength (e.g. magnitude) and sign by engineering the size of gaps (e.g. gaps 552 and 554) and placement of waveguides 530 between electrodes 520. In some embodiments, instead of changing the placement of waveguides 530, the positions of electrodes 524+-i and 524--i may be switched. In some embodiments, nonzero chirp is introduced to each waveguide 530. In some embodiments, electro-optic device 500 is configured such that not all waveguides 530 have a controlled chirp introduced. For some applications, only waveguides 530 carrying optical signals of very chirped wavelength may be adjusted to have a compensating chirp. In some embodiments, the sign of the chirp introduced is changed by choosing the gaps, the magnitude by changing the relative gap values. Because each channel may carry a different wavelength, each channel experiences different chirp due to fiber propagation. Consequently, it may be advantageous to adjust the chirp separately for each waveguide 530.

Optical device 500 may introduce controlled chirp in each channel that compensates for dispersion in optical fibers and/or other components coupled with waveguides 530. As a result, the optical signal may be better maintained and longer transmission distances may be achieved. Electro-optic device 500 may thus share the benefits of electro-optic device(s) 100, 200, and/or 300. For example, each channel may have independently controlled chirp and the introduction of controlled chirp may not adversely affect the extinction ratio of the channel(s) of electro-optic device 500. Consequently, performance of an optical network using electro-optic device 500 may be improved.

FIG. 6 depicts an embodiment of an electro-optic device having engineered chirp. For clarity, not all components are shown and FIG. 6 is not to scale. For simplicity, drivers, voltage sources, the source of the optical signal, and other portions of such a system are not shown. Electro-optic device 600 is analogous to electro-optic device(s) 400 and/or 500. Thus, four devices, each of which is analogous to device(s) 100, 100', 200, and/or 300, are included in electro-optic device 600. Another number of devices (i.e. channels) may be included in other embodiments.

Electro-optic device 600 includes waveguides 630-1, 630-2, 630-3, and 630-4 (collectively or generically waveguide(s) 630 or waveguide 630-i). Each waveguide 630-i (where i is 1, 2, 3, or 6) includes arms 632-i and 634-i (collectively or generically arm(s) 632 and 634). Electro-optic device also includes electrodes 620-i (collectively or generically electrodes 620) including ground electrode 626-i (collectively or generically ground electrode 626) and electrode trio 624-i (collectively or generically electrode trio 624), where i is 1, 2, 3, or 6. Each trio 624-i includes differential electrodes 624+-i and 624--i (collectively or generically differential electrodes 624+ and 624-) and ground electrodes 624G-i (collectively or generically ground electrode 624G), where i is 1, 2, 3, or 6. Waveguide arm 632 is between differential electrodes 624+ and 624-. Waveguide arms 634 are between differential electrodes 624- and ground electrode 624G. Electrodes 620 and waveguides 630 are, therefore, analogous to electrodes 120, 220, 320 and 420 and waveguides 130, 130', 230, 330, and 430. Thus, waveguides 630 includes or consists of TFLC materials such as TFLN and/or TFLT. Electro-optic device 600 may also include cladding and a substrate structure analogous to cladding 140 and substrate structure 101. Chirp for each waveguide 630 may be controlled in the manner analogous to that discussed for electro-optic devices 100, 100', 200, 300, and/or 400. For example, the gaps between electrodes 620, the signal applied to differential electrodes 624+ and 624-, and the lengths of electrodes 620 proximate to waveguide arms 632 and 634 can be engineered to provide the desired chirp. In electro-optic device, the locations of waveguide arms 632 and 634 as well as the gaps between electrodes 620 may be selected to analogous to that of waveguide arms 532 and 534 as well as gaps between electrodes 520. Thus, the chirp for waveguides 630-2 and 630-3 is controlled at least in part through the gaps between electrodes 620.

Engineering the chirp through the gaps between electrodes 620 can cause a reduction in the electric field provided to the waveguide arms 632 or 634. This reduction in electric field affects the V-pi of the modulator. More specifically, the change in the gap affects the field at the waveguide, and thus the modulation. V-pi may, therefore, change. In some embodiments the difference in V-pi may be compensated for by driving the channels with different voltage swings. In some embodiments, the same voltage swing may be used for each channel (e.g. each waveguide 630). Electro-optic device 600 is one such device. Because electrical signals in electrodes 624+ and 624- are the same for each waveguide 630, different lengths and/or design of electrodes 624+ and 624- may be used to achieve a more uniform V-pi and bandwidth response. In electro-optic device 600, electrodes 624+-1, 624--1, 624+-4, and 624--4 are shorter than electrodes 624+-2, 624--2, 624+-3, and 624--3. Electrodes 620-1 are more efficient because the uniform gaps between electrodes 620-1 are smaller. Electrodes 620-4 are more efficient for similar reasons. Electrodes 620-2 and 620- have wider gaps 652 and 654. Therefore, electrodes 620-2 and 620-3 (length 1) are longer to achieve the same driving voltage benchmarks as electrodes 620-1 and 620-4. To manage V-pi, therefore, electrodes 620-1 and 620-4 (length 11) are shorter than electrodes 620-2 and 620-3 (length 1). In some embodiments, the difference in length may be a few millimeters.

Electrodes 620-2 and 620-3 may suffer greater microwave loss at high frequencies due to propagation loss. This can be offset by designing the electrodes to be different. For example, the shorter electrodes 620-1 and 620-4 may use regular uniform channel electrode(s), whereas the longer electrodes 620-2 and 620-3 may use different electrode(s), for example electrodes with extensions, to achieve a similar high speed response in addition to V-pi as the shorter electrodes 620-1 and 620-4. Thus, V-pi and chirp can also be independently controlled together by changing the relative gaps between the signal and ground electrodes and the lengths of electrodes.

Optical device 600 may introduce controlled chirp in each channel that compensates for dispersion in optical fibers and/or other components coupled with waveguides 630. As a result, the optical signal may be better maintained and longer transmission distances may be achieved. Electro-optic device 600 may thus share the benefits of electro-optic device(s) 100, 200, and/or 300. For example, each channel may have independently controlled chirp and the introduction of controlled chirp may not adversely affect the extinction ratio of the channel(s) of electro-optic device 600. Consequently, performance of an optical network using electro-optic device 600 may be improved.

Figure 7:
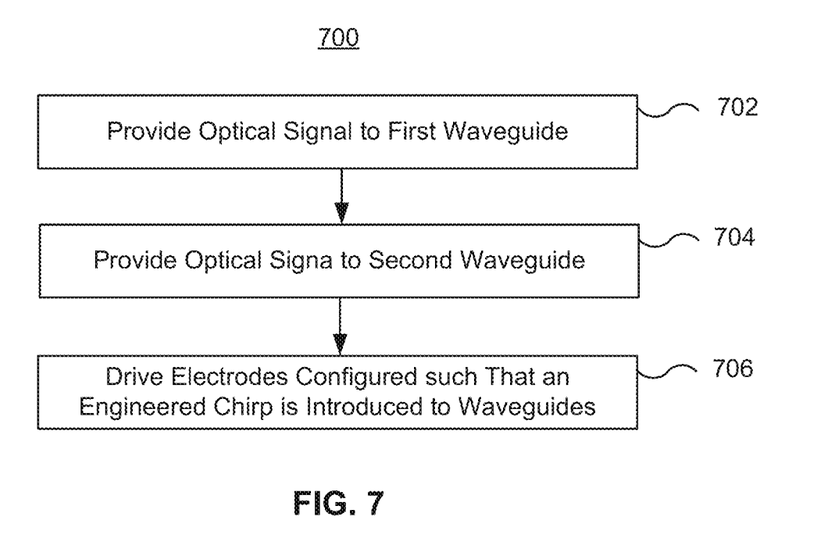
FIG. 7 is a flow chart depicting an embodiment of a method for using an electro-optic device having engineered chirp.

FIG. 7 is a flow chart depicting an embodiment of method 700 for using an electro-optic device having engineered chirp. Thus, method 700 may be used to modulate optical signal(s). Method 700 is described in the context of processes that may have sub-processes. Although described in a particular order, another order not inconsistent with the description herein may be utilized. Further, although described in the context of a single optical signal, method 700 may be extended to multiple optical signals and multiple differential signals.

An optical signal is provided to a first waveguide, at 702. A second optical signal is provided to a second waveguide, at 704. In some embodiments, the first and second waveguides are arms of a waveguide (e.g. the arms of a Mach-Zehnder interferometer). Thus, 702 and 704 may include providing a single optical signal to a waveguide including splitter(s). The waveguide carries the signal and, because of the presence of the splitter(s), divides the signal between at least two arms of the waveguide. Thus, 702 and 704 may be carried out by providing different optical signals or by splitting an optical signal.

Electrode signals are driven through electrodes that correspond to the first and second waveguides, at 706. The electrodes of may form a first differential electrode pair proximate to a portion of the first waveguide and a second differential electrode pair proximate to the second waveguides. The electrode signals in first differential electrode pair and the second differential electrode pair are configured to provide a first modulation to the first optical signal and a second modulation to the second optical signal. The first modulation is different from the second modulation. For example, in some embodiments, the electrode signals themselves may differ in a manner that results in different modulations in the first and second waveguides. In some embodiments, the electrodes and waveguides are configured such that the first and second modulations are different. Thus, the electro-optic device has an engineered chirp.

For example, method 700 may be used with electro-optic device 100. In such an embodiment, 702 and 704 are performed by providing an optical signal to waveguide 130, which splits the optical signal and provides a portion of the optical signal to each of waveguide arms 132 and 134. Thus, waveguide arm 132 may be the first waveguide, while waveguide arm 134 is the second waveguide. At 706, an electrode signal is driven through electrodes 124+ and 124=. In such an embodiment, the first differential electrode pair that modulates the signal in waveguide 132 are electrodes 124+ and 124−. The second differential electrode pair that modulates the signal in waveguide 134 are negative electrode 124− and ground electrode 124G. Because of the configuration of electrodes 124+, 124−, and 124G and waveguide 130, the electrode signals drive through electrodes 124+ and 124− result in different modulations in waveguide arms 132 and 134. Consequently, a controlled chirp is intentionally provided to waveguide 130. Method 700 may be used in an analogous manner with electro-optic devices 100', 200, 300, 400, 500, and/or 600. Thus, the benefits of such electro-optic devices may be achieved.

Thus, using method 700, a controlled chirp may be introduced to a pair of waveguides. The controlled chirp provided in method 700 may compensate for dispersion in optical fibers and/or other components coupled with the waveguides. As a result, the optical signal may be better maintained and longer transmission distances may be achieved. Moreover, inducing controlled chirp using method 700 may not adversely affect the extinction ratio of the electro-optic device. Consequently, performance of an optical network using method 700 may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electro-optic device, comprising:
   a first waveguide including a first thin film lithium-containing (TFLC) electro-optic material and being configured to carry a first optical signal;
   a second waveguide including a second TFLC electro-optic material and being configured to carry a second optical signal; and
   a plurality of electrodes including a first ground electrode, a first signal electrode, a second signal electrode, and a second ground electrode, the first signal electrode and the second signal electrode being between the first ground electrode and the second ground electrode, the first signal electrode and the second signal electrode forming a differential electrode pair proximate to a portion of the first waveguide and to a portion of the second waveguide;
   wherein the differential electrode pair is configured to provide a first modulation to the first optical signal and a second modulation to the second optical signal, a first magnitude of the first modulation being different from a second magnitude of the second modulation such that the electro-optic device has an engineered chirp; and
   wherein only the portion of the first waveguide or only the portion of the second waveguide is between the first signal electrode and the second signal electrode along an entire length of electro-optic modulation.

2. The electro-optic device of claim 1, wherein the first signal electrode, the second signal electrode, and the second ground electrode form a differential electrode trio.

3. The electro-optic device of claim 2, wherein the first signal electrode and the second signal electrode are separated by a first gap proximate to the portion of the first waveguide; and
   wherein the second signal electrode and the second ground electrode are separated by a second gap proximate to the portion of the second waveguide, the second gap being different from the first gap such that the first modulation has the first magnitude and the second modulation has the second magnitude.

4. The electro-optic device of claim 3, wherein the first gap and the second gap are configured such that the first magnitude (M1) for the first waveguide is twice as large as the second magnitude (M2) for the second waveguide, the electro-optic device having chirp parameter (C) of C=1/3, with C=(M1−M2)/(M1+M2).

5. The electro-optic device of claim 3, wherein the first gap and the second gap are configured such that the first magnitude (M1) for the first waveguide and the second magnitude (M2) for the second waveguide result in the electro-optic device having a chirp parameter of at least 0.1 and not greater than 0.9 or not greater than −0.1 and at least −0.9, where C=(M1−M2)/(M1+M2).

6. The electro-optic device of claim 3, further comprising:
a third waveguide including a third TFLC electro-optic material and being configured to carry a third optical signal; and
a fourth waveguide including a fourth TFLC electro-optic material and being configured to carry a fourth optical signal;
wherein the plurality of electrodes include a second differential electrode pair proximate to a portion of the third waveguide and to a portion of the fourth waveguide;
wherein the differential electrode pair has a first length proximate to the portion of the first waveguide and to the portion of the second waveguide and the second differential electrode pair has a second length proximate to the portion of the third waveguide and to the portion of the fourth waveguides, the first length being different from the second length.

7. The electro-optic device of claim 3, wherein the first waveguide and the second waveguide are coupled to an optical signal transmitter having a dispersion, the engineered chirp being opposite to the dispersion.

8. The electro-optic device of claim 7, wherein the optical signal transmitter includes an optical fiber coupled with the first and second waveguides, the optical fiber having the dispersion.

9. The electro-optic device of claim 3, wherein the first waveguide and the second waveguide are arms of a modulator waveguide including the first waveguide, the second waveguide, a first splitter and a second splitter, the first waveguide and the second waveguide being between the first splitter and the second splitter.

10. An electro-optic device, comprising:
a plurality of waveguide pairs, each of the plurality of waveguide pairs including a first waveguide and a second waveguide, each of the plurality of waveguide pairs including a thin film lithium-containing (TFLC) electro-optic material and being configured to carry a first optical signal in the first waveguide and a second optical signal in the second waveguide; and
a plurality of electrodes trios, each of the plurality of electrode trios including a differential electrode pair and a ground electrode, a first signal electrode of the differential electrode pair being proximate to a portion of the first waveguide, a second signal electrode of differential electrode pair being proximate to a region between the portion of the first waveguide and a portion of the second waveguide, the ground electrode being proximate to the portion of the second waveguide, and only the portion of the first waveguide being between the first signal electrode and the second signal electrode along an entire length of electro-optic modulation;
at least one additional ground electrode, the first signal electrode and the second signal electrode of an electrode trio of the plurality of electrode trios being between the ground electrode of the electrode trio and an additional ground electrode of the at least one additional ground electrode;
wherein each of the plurality of electrode trios is configured to provide a first modulation having a first magnitude to the first optical signal and a second modulation having a second magnitude to the second optical signal, the first magnitude being different from the second magnitude for at least one of the plurality of electrode trios such that at least one of the plurality of waveguide pairs has an engineered chirp.

11. The electro-optic device of claim 10, wherein the first signal electrode and the second signal electrode of the at least one of the plurality of electrode trios are separated by a first gap proximate to the portion of the first waveguide of the at least one of the plurality of waveguide pairs; and
wherein the second signal electrode and the ground electrode of the at least one of the plurality of electrode trios are separated by a second gap proximate to the portion of the second waveguide of the at least one of the plurality of waveguide pairs, the second gap being different from the first gap such that the first modulation has the first magnitude and the second modulation has the second magnitude for the at least one of the plurality of waveguide pairs.

12. The electro-optic device of claim 11, wherein the first gap and the second gap for the at least one of the plurality of electrode trios are configured such that the first magnitude (M1) for the first waveguide of the at least one of the plurality of waveguide pairs and the second magnitude (M2) for the second waveguide of the at least one of the plurality of waveguide pairs result in of the at least one of the plurality of waveguide pairs having a chirp parameter of at least 0.1 and not greater than 0.9 or not greater than −0.1 and at least −0.9, where $C=(M1-M2)/(M1+M2)$.

13. The electro-optic device of claim 11, wherein a first electrode trio of the plurality of electrode trios has a first length proximate to a first waveguide pair of the plurality of waveguide pairs and a second electrode trio of the plurality of electrode trios has a second length proximate to a second waveguide pair of the plurality of waveguide pairs, the first length being different from the second length.

14. The electro-optic device of claim 11, wherein each of the plurality of waveguide pairs is coupled to an optical signal transmitter having a dispersion, the engineered chirp being configured based on the dispersion.

15. The electro-optic device of claim 14, wherein the optical signal transmitter includes an optical fiber coupled to the electro-optic device.

16. A method, comprising:
providing a first optical signal to a first waveguide including a first thin film lithium-containing (TFLC) electro-optic material;
providing a second optical signal to a second waveguide including a second TFLC electro-optic material, an electro-optic device including the first waveguide and the second waveguide; and
driving electrode signals through a plurality of electrodes including a first ground electrode, a first signal electrode, a second signal electrode, and a second ground electrode, the first signal electrode and the second signal electrode being between the first ground electrode and the second ground electrode, the first signal electrode and the second signal electrode being a differential electrode pair proximate to a portion of the first waveguide and proximate to a portion of the second waveguide, the electrode signals in the differential electrode pair being configured to provide a first modulation having a first magnitude to the first optical signal and a second modulation having a second magnitude to the second optical signal, the first modulation being different from the second modulation such that the electro-optic device has an engineered chirp; and
wherein only the portion of the first waveguide or only the portion of the second waveguide is between the first signal electrode and the second signal electrode along an entire length of electro-optic modulation.

17. The method of claim 16, wherein the first signal electrode, the second signal electrode, and the second ground electrode form a differential electrode trio.

18. The method of claim 17, wherein the first signal electrode and the second signal electrode are separated by a first gap proximate to the portion of the first waveguide; and wherein the second signal electrode and the second ground electrode are separated by a second gap proximate to the portion of the second waveguide, the second gap being different from the first gap such that the first magnitude (M1) for the first waveguide and the second magnitude (M2) for the second waveguide result in the electro-optic device having a chirp parameter of at least 0.1 and not greater than 0.9 or not greater than −0.1 and at least −0.9, where C=(M1−M2)/(M1+M2).

19. The method of claim 18, further comprising:

driving a third optical signal through a third waveguide including a third TFLC electro-optic material; and driving a fourth optical signal through a fourth waveguide including a fourth TFLC electro-optic material;

wherein the plurality of electrodes include a second differential electrode pair proximate to a portion of the third waveguide and to a portion of the fourth waveguide;

wherein the differential electrode pair has a first length proximate to the portion of the first waveguide and to the portion of the second waveguide and the second differential electrode pair has a second length proximate to the portion of the third waveguide and to the portion of the fourth waveguide, the first length being different from the second length.

20. The method of claim 18, wherein the first waveguide and the second waveguide are coupled to an optical signal transmitter having a dispersion, the engineered chirp being opposite to the dispersion.

\* \* \* \* \*